(12) United States Patent
Varela

(10) Patent No.: US 7,221,560 B2
(45) Date of Patent: May 22, 2007

(54) MOBILE DIGITAL DEVICE WITH RETRACTABLE KEYBOARD

(75) Inventor: Valerio Varela, Metarie, LA (US)

(73) Assignee: Cingular Wireless II, LLC, Atlanta, GA (US)

( * ) Notice: Subject to any disclaimer, the term of this patent is extended or adjusted under 35 U.S.C. 154(b) by 194 days.

(21) Appl. No.: 11/043,811

(22) Filed: Jan. 26, 2005

(65) Prior Publication Data
US 2006/0164799 A1    Jul. 27, 2006

(51) Int. Cl.
G06F 1/16    (2006.01)
(52) U.S. Cl. .......................... 361/680; 361/683; 341/22
(58) Field of Classification Search ................. 361/680
See application file for complete search history.

(56) References Cited

U.S. PATENT DOCUMENTS

| | | | |
|---|---|---|---|
| 6,556,430 B2* | 4/2003 | Kuo et al. .................. | 361/680 |
| 6,781,824 B2* | 8/2004 | Krieger et al. .............. | 361/683 |
| 6,983,175 B2* | 1/2006 | Kwon ...................... | 455/575.1 |
| 2003/0128190 A1* | 7/2003 | Wilbrink et al. ............ | 345/169 |
| 2004/0239533 A1* | 12/2004 | Bollman ..................... | 341/22 |
| 2005/0057891 A1* | 3/2005 | Madsen et al. ............. | 361/680 |
| 2005/0105256 A1* | 5/2005 | Chuang ...................... | 361/680 |
| 2006/0202963 A1* | 9/2006 | Hermann .................... | 345/168 |

OTHER PUBLICATIONS

PC Magazine, www.pcmag.com article, review dated Aug. 3, 2004, printed Dec. 29, 2004, T-Mobile Sidekick II, 2 pages.
Siemens, The Premium Messaging Device For Successful Professionals, SK65, 3 pages.

* cited by examiner

*Primary Examiner*—Anatoly Vortman
*Assistant Examiner*—Anthony Q. Edwards
(74) *Attorney, Agent, or Firm*—Gardner Groff Santos & Greenwald PC

(57) ABSTRACT

A mobile digital device includes a device body, a display screen, and a keyboard having two portions that can each be pivoted between a deployed position and an un-deployed position. When both keyboard portions are in their deployed positions, they together define a user-ready keyboard.

14 Claims, 8 Drawing Sheets

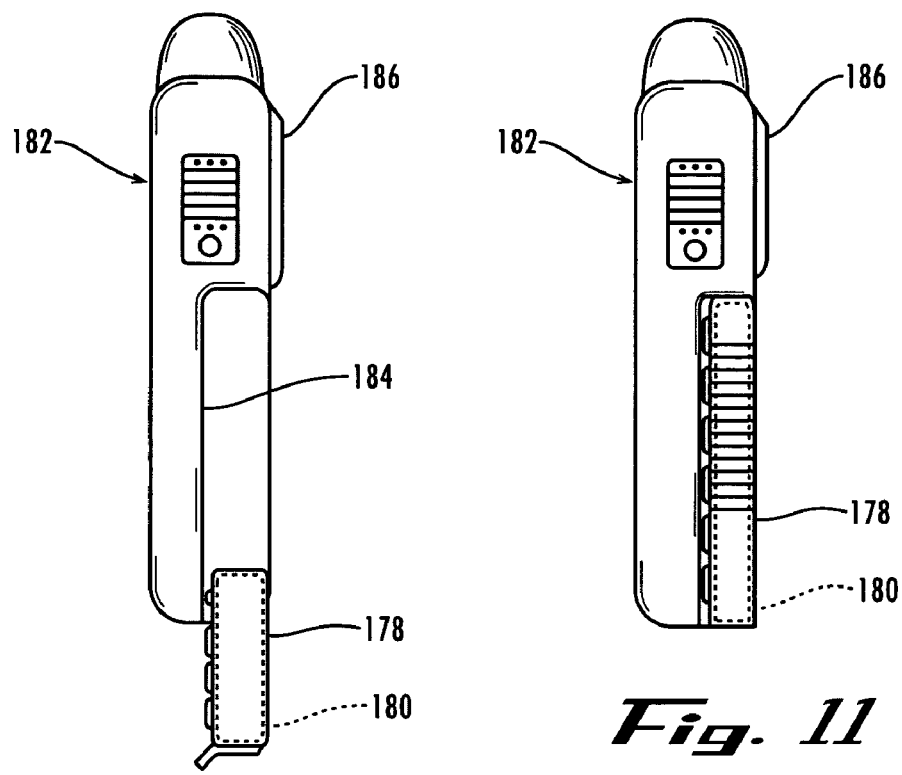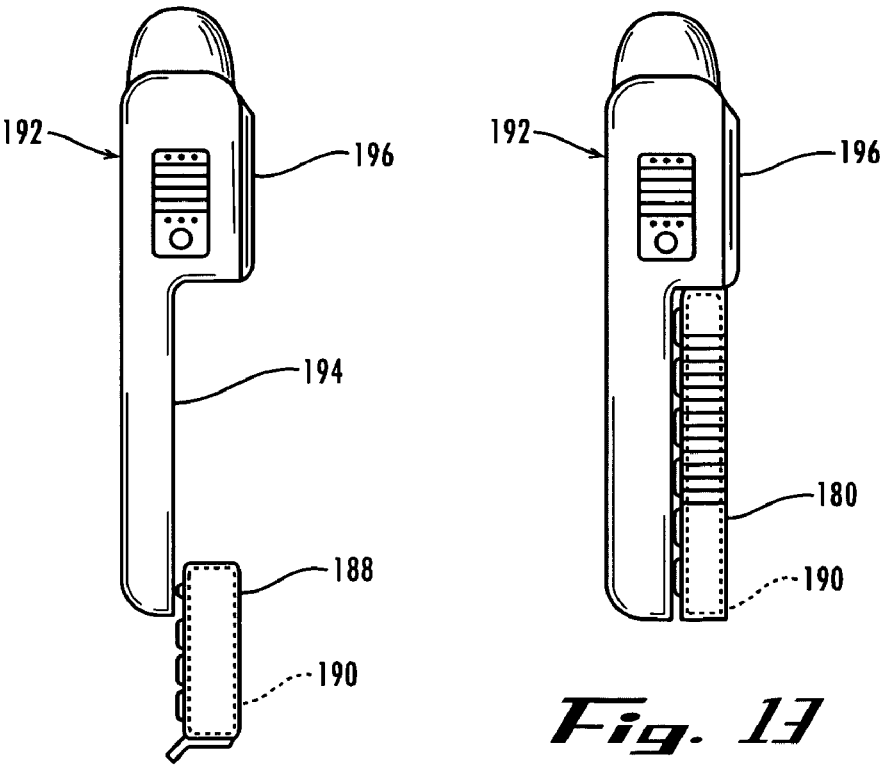

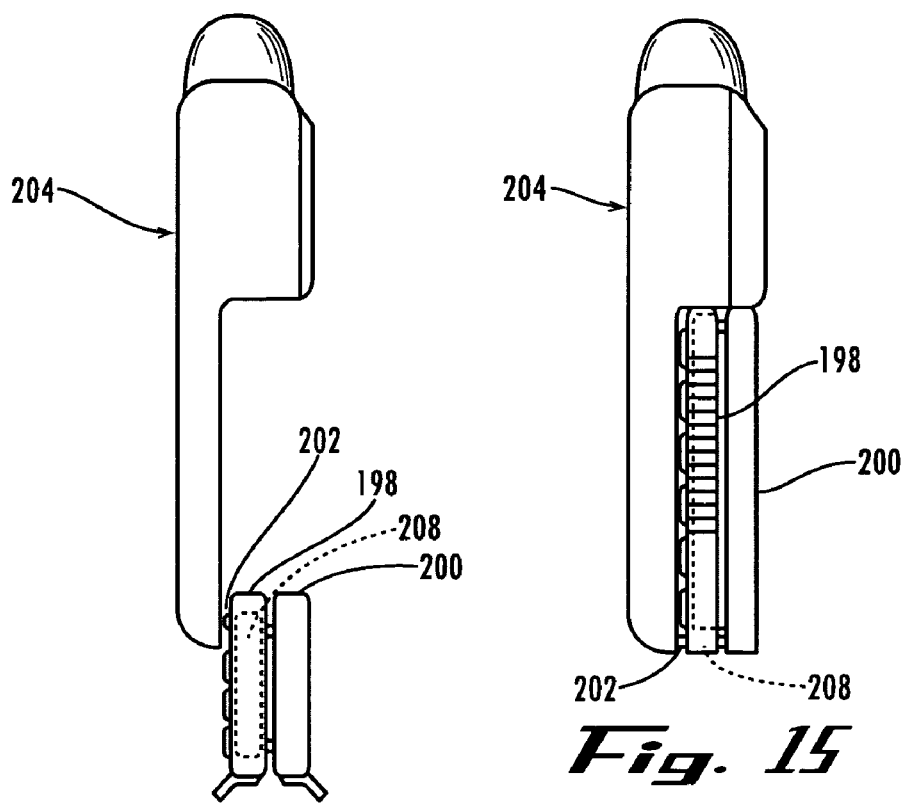
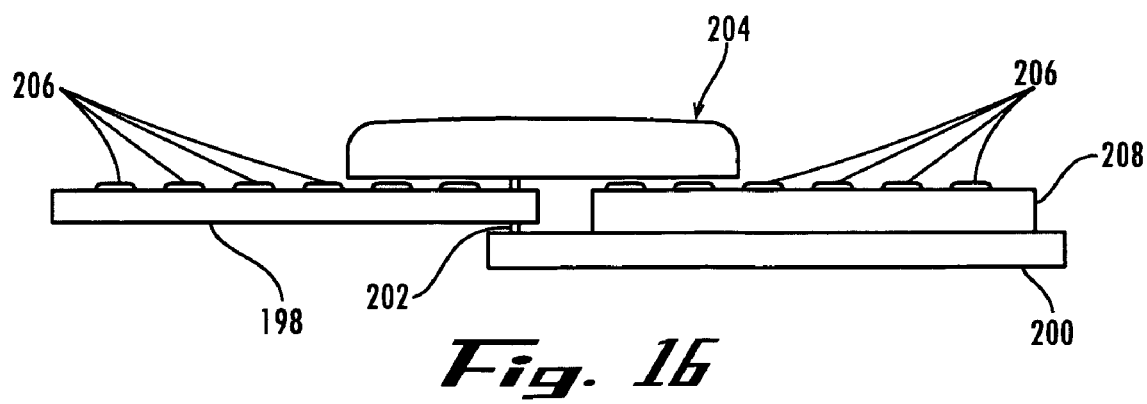

MOBILE DIGITAL DEVICE WITH RETRACTABLE KEYBOARD

TECHNICAL FIELD OF THE INVENTION

The present invention relates generally to mobile or handheld digital devices and, more specifically, to mobile digital devices having keyboards.

DESCRIPTION OF THE RELATED ART

It has long been desirable for text-based systems and devices, such as computers, to include text keyboards as part of their user interfaces, typically along with a display screen on which a user can read text. As computers, electronic organizers, pagers, personal digital assistants (PDAs) and the like have been increasingly miniaturized, it has become increasingly challenging to provide them with user interfaces suited for entering text. Although compact text keyboards having fewer keys than the number of letters in the alphabet have been developed, people are generally more comfortable and can enter text more efficiently using a complete text keyboard, such as one having the standard QWERTY layout familiar to typists. Complete text keyboards are not easily integrated into a small device without making their keys too small for a person to operate comfortably. Moreover, the larger the keyboard of a small device, the less area is available for the display screen and other features.

Some mobile communication devices can transmit and receive e-mail messages, text messages, or other text-based information. Therefore, some of these devices, such as those based upon the BLACKBERRY technology of Research in Motion Ltd., have been equipped with miniature text keyboards. Using a BLACKBERRY device, one can send and receive e-mail messages and perform address book, calendar, organizer and other functions typical of PDAs and similar devices. A variety of BLACKBERRY devices with a number of different types of text keyboards have been produced. In some BLACKBERRY devices, a display screen and a complete QWERTY keyboard below it share the area of the face of the device. A user can readily type on the small keys with two fingers (usually thumbs) and view the display screen in a manner resembling that in which a typist uses the full-sized keyboard of a desktop computer.

In the SK65 BLACKBERRY device produced by Siemens AG, a keyboard unit, back to back against the housing of the device, pivots on an axis centered in the housing between a storage position, in which it is aligned with and concealed by the housing, and an exposed position, in which it is perpendicular to the housing. To expose the keyboard, the user twists the keyboard and housing with respect to one another. In the exposed position, the QWERTY keyboard is split, with one-half of the keyboard extending from the left edge of the housing, and the other half extending from the right edge of the housing.

Another mobile communication device, the SIDEKICK and SIDEKICK II, offered by T-Mobile USA, includes a QWERTY keyboard concealed beneath a display screen unit. To expose the keyboard, the user flips the screen unit upwardly and rotates it around until it is seated above the keyboard.

Although these arrangements provide a QWERTY keyboard in a compact mobile communication device, the devices may be perceived by users as bulky, and typists may find it awkward using unfamiliar split-keyboard arrangements. Accordingly, it would be desirable to provide a keyboard and display screen arrangement in a compact mobile digital device that can maximize screen area as well as user comfort. It is to such a method and apparatus that the present invention is primarily directed.

SUMMARY OF THE INVENTION

Briefly described, in one form the invention comprises a mobile digital device that includes a device body, a display screen mounted or otherwise coupled to the device body, and a keyboard having two portions that are each movably connected to the device body between an extended or otherwise deployed position and a retracted or otherwise un-deployed position. When both keyboard portions are in their deployed positions, together they define a complete text keyboard. In a preferred embodiment of the invention, the two keyboard portions unite at their edges and thus become adjacent or contiguous to form a QWERTY keyboard unit at the bottom edge of the body, below the display screen. Using legs that optionally can be included in such embodiments of the invention, a user can prop the device on a table or other work surface and type on the keyboard. The device includes a processing system, such as a digital wireless communication system that allows the user to transmit messages or other information entered on the keyboard and view on the screen messages that are received. The arrangement of a QWERTY keyboard below a display screen resembles that of a conventional computer and is therefore familiar and comfortable to users. When the two keyboard portions are in their un-deployed positions, they are concealed or otherwise disposed within the outline or profile of the device body. For example, in a preferred embodiment, the keyboard portions retract into slots in the left and right sides of the body, respectively.

BRIEF DESCRIPTION OF THE DRAWINGS

FIG. 10 is a side view of an alternative mobile communication device according to another form of the present invention, shown with its keyboard in an extended position.

FIG. 11 is a side elevational view of the mobile communication device of FIG. 10, shown with its keyboard in a retracted position.

FIG. 12 is a side elevational view of another alternative mobile communication device according to another form of the present invention, shown with its keyboard in an extended position.

FIG. 13 is a side elevational view of the mobile communication device of FIG. 12, shown with its keyboard in a retracted position.

FIG. 14 is a side view of still another alternative mobile communication device according to another form of the present invention, shown with its keyboard in an extended position.

FIG. 15 is a side elevational view of the mobile communication device of FIG. 14, shown with its keyboard in a retracted position.

FIG. 16 is a bottom elevational view of the mobile communication device of FIGS. 14–15, shown with its keyboard in an extended position.

DETAILED DESCRIPTION

Figure 1:
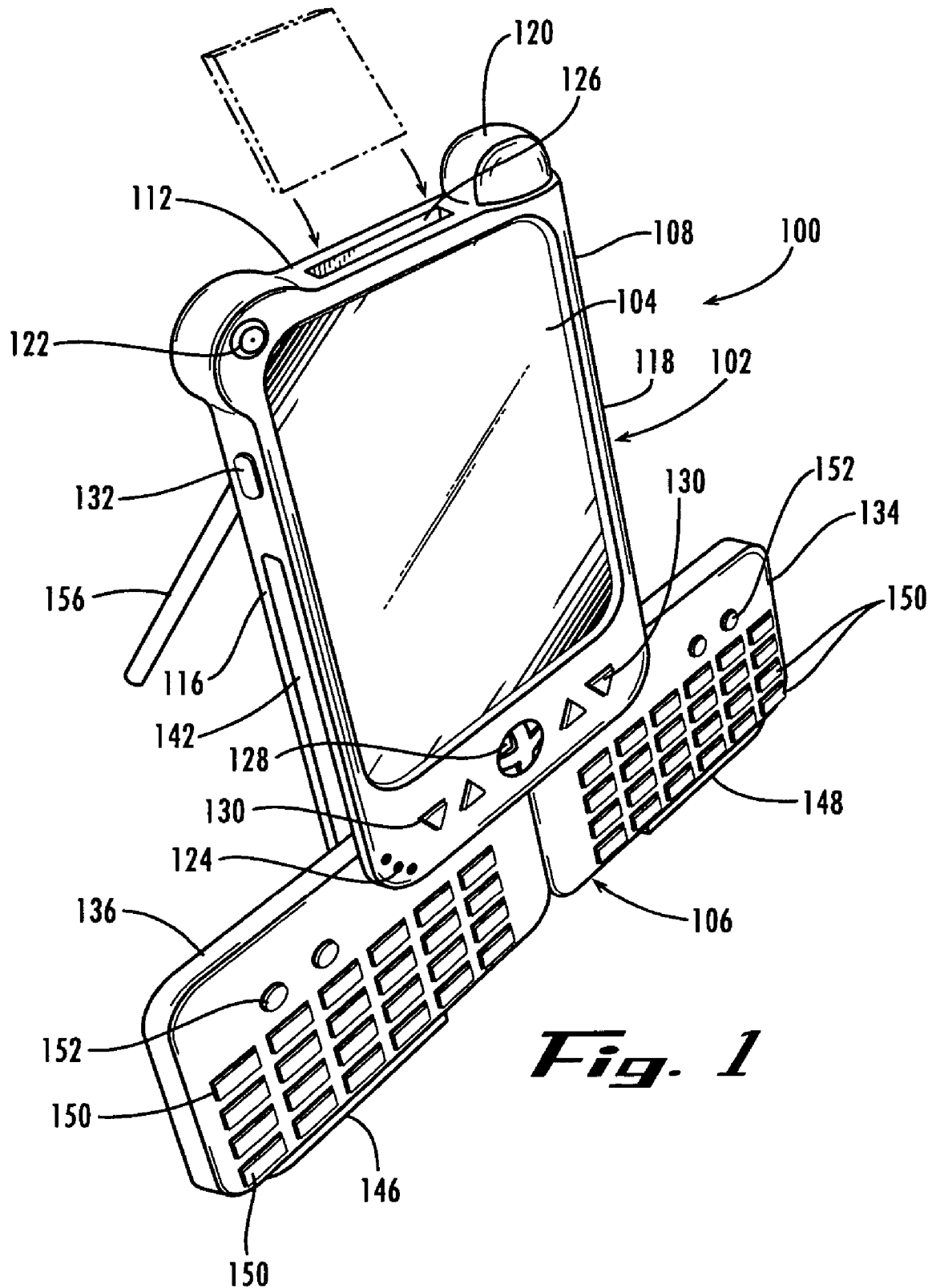
FIG. 1 is a perspective view of a mobile communication device according to one form of the present invention, shown with its keyboard in an extended position.
Figure 2:
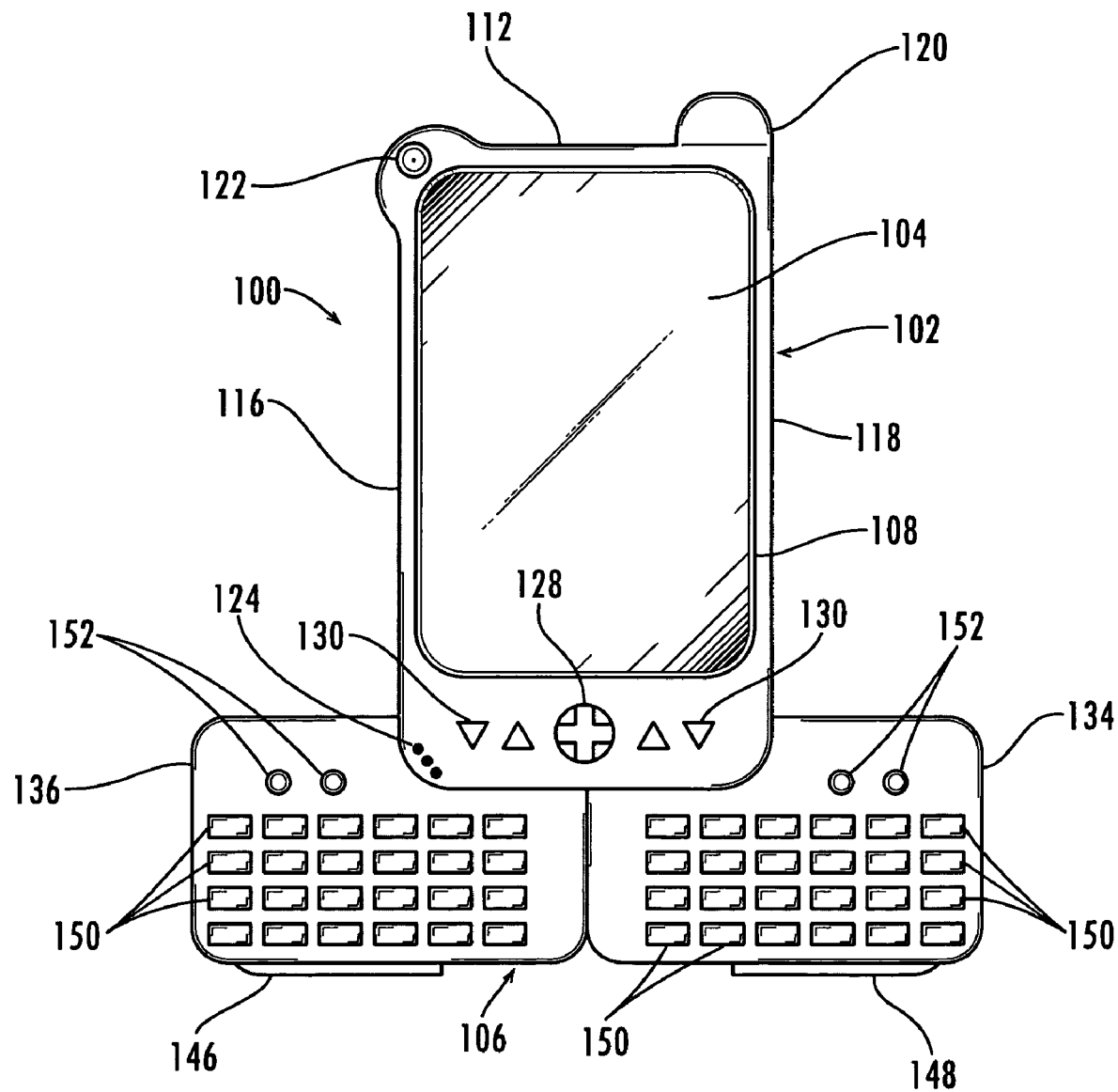
FIG. 2 is a front elevational view of the mobile communication device of FIG. 1, shown with its keyboard in an extended position.

In the following description, like reference numerals indicate like components to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention.

As illustrated in FIG. 1, a mobile communication device 100 includes or comprises a device body 102, a display screen 104, and a keyboard 106. Keyboard 106 is shown in the extended position, ready for use, and can be stored or concealed in a retracted position when not in use, as described in further detail below. Although not shown to scale in the drawings, mobile communication device 100 is approximately the size of a typical conventional handheld wireless communication-enabled PDA, cellular telephone, BLACKBERRY device, and other such devices that are typically referred to generally as mobile communication devices.

Figure 5:
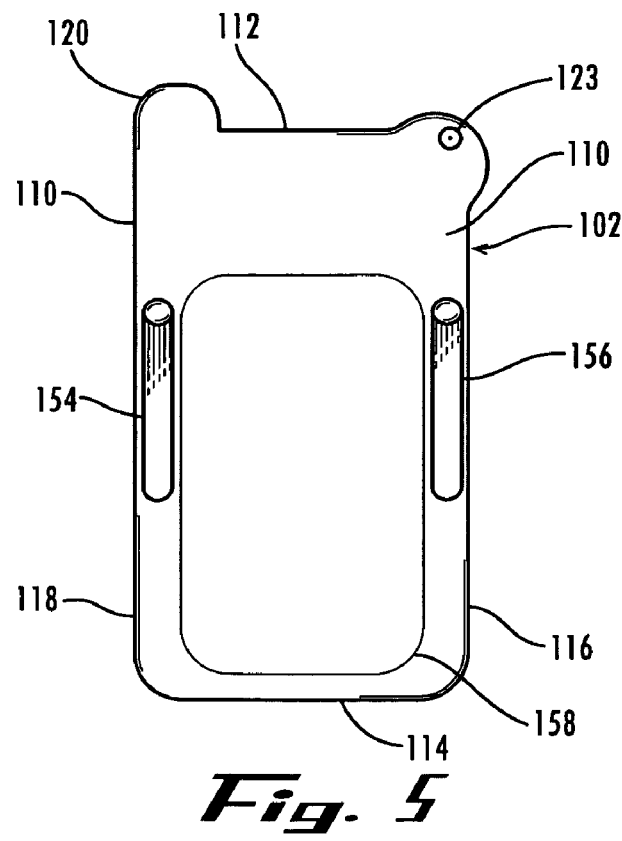
FIG. 5 is a rear elevational view of the mobile communication device of FIG. 1 shown with its keyboard in a retracted position.
Figure 6:
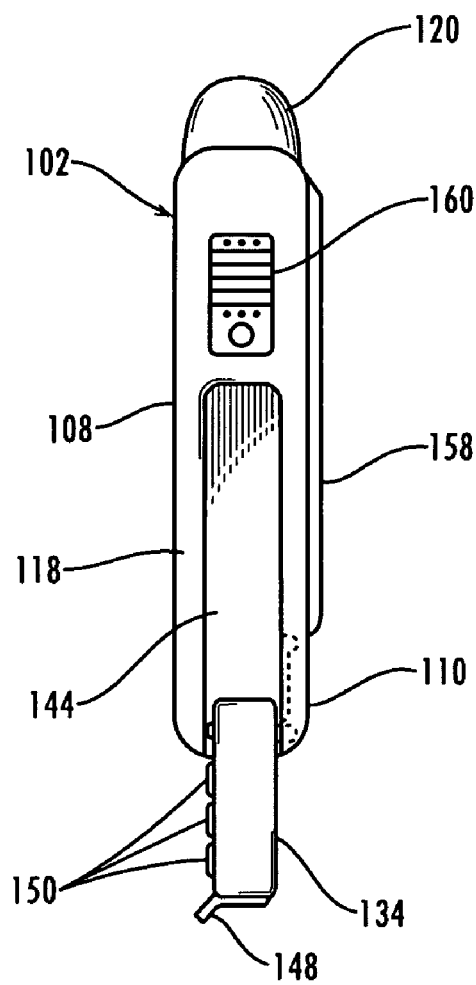
FIG. 6 is a side elevational view of the mobile communication device of FIG. 1, shown with its keyboard in an extended position.
Figure 7:
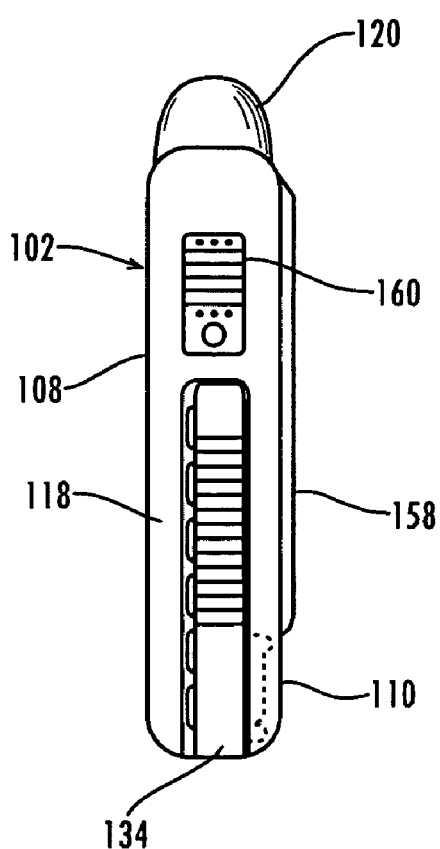
FIG. 7 is a side elevational view of the mobile communication device of FIG. 1, shown with its keyboard in a retracted position.

Device body 102 can be of any suitable shape and structure, but in the illustrated embodiment of the invention it is a generally bar-like or boxy housing and thus a generally rectangular outline or profile. Thus, it has a generally rectangular and planar front face 108, rear face 110, top 112, bottom 114, left side 116, and right side 118 (see also FIGS. 2–5). As used in this manner, the terms "generally rectangular," "generally planar" or "flat," etc., are meant to refer to the general shapes without regard to protrusions and recesses arising from elements that may be mounted on the surfaces or to contours that the device body may have for ergonomic, aesthetic or other purposes. For example, in the illustrated embodiment, an antenna 120 protrudes from top 112, and a camera 122 of the type conventionally included in some cellular telephones and the like, is disposed in an ear-like corner of front face 108. A second camera 123 can be similarly disposed on rear face 110 (see FIG. 5). A microphone input 124 is provided on front face 108. In addition, in this embodiment, device body 102 has a plug-like slot 126 for receiving what is currently referred to in the art as a "Secure Digital Memory card" (shown in dashed line in FIG. 1) or a similar external card or plug-in device. Also, although keyboard 106 is the primary user input device, in some embodiments of the invention a suitable number and arrangement of user input keys 128, 130, etc., preferably of the soft rubber type, can additionally be provided on front face 108 as part of the user interface to which keyboard 106 and screen 104 also relate. Key 128 can be a joystick-like pointing device for selecting menu items displayed on screen 104 or other pointing tasks, and keys 130 can be arrow-like buttons for scrolling, etc., or they can be used for any other suitable purpose for which such keys are conventionally used in mobile communication devices. A power button 132 is also provided.

Display screen 104 is disposed on or (equivalently, in this context) in the face or front 108 of device body 102 in the conventional manner in which such screens are mounted in mobile communication devices, PDAs and the like, but in other embodiments of the invention it can be coupled to the device body in any other suitable manner, such as via a supporting structure or mechanism. Display screen 104 can be of the LCD type, OLED type, or any other suitable type. It can also be a touch-screen to provide additional user interface flexibility. Note that display screen 104 can occupy a significant portion (e.g., on the order of 80% or more) of the area of front face 108 because keyboard 106 does not take up any of the area on front face 108 as do the keyboards of some conventional communication devices. As noted above, it may be desirable in some embodiments of the invention to include a small number of user control buttons, a camera, or other elements and features on front face 108, but the remaining area of front face 108 can be devoted to display screen 104. Maximizing the area of the display screen of a mobile communication device in this manner is highly desirable because it allows more information to be displayed and renders the displayed information easier to read.

Figure 3:
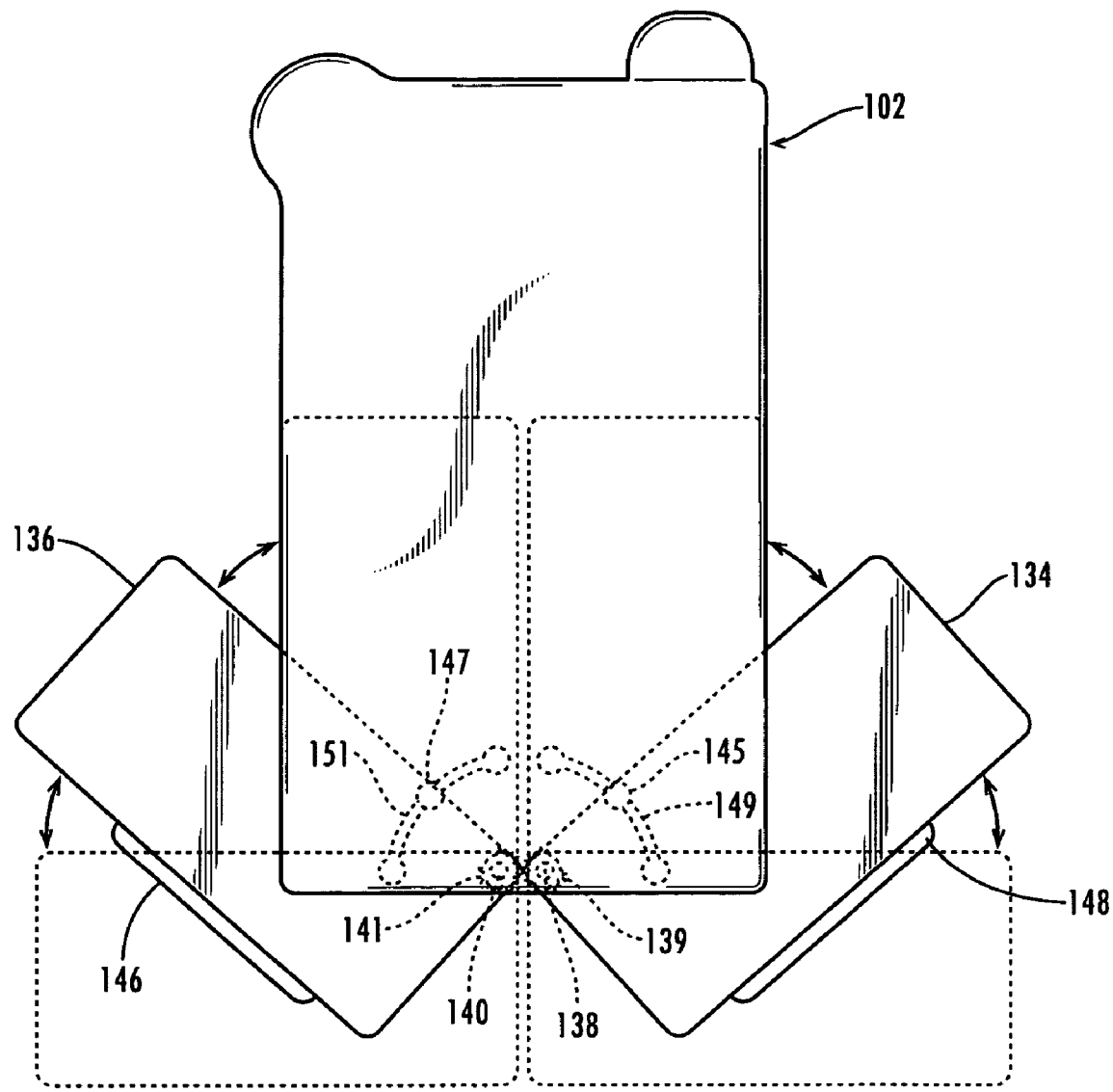
FIG. 3 illustrates the movement of the keyboard portions of the mobile communication device of FIG. 1 between extended and retracted positions with respect to the front outline or profile of the device body.
Figure 4:
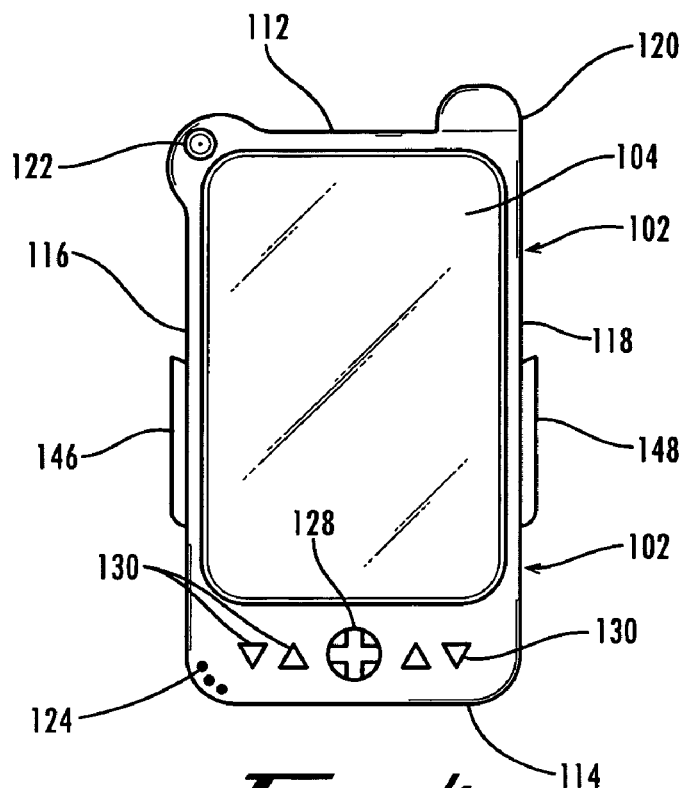
FIG. 4 is a front elevational view of the mobile communication device of FIG. 1, shown with its keyboard in a retracted position.
Figure 8:
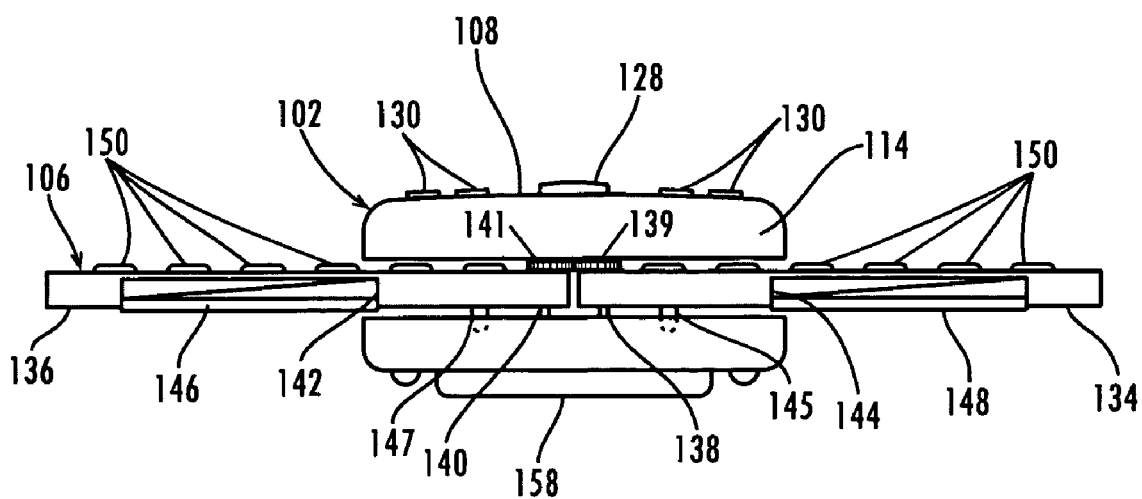
FIG. 8 is a bottom elevational view of the mobile communication device of FIG. 1, shown with its keyboard in an extended position.

Keyboard 106 comprises a first keyboard portion 134 and a second keyboard portion 136. As best shown in FIGS. 3 and 8, keyboard portions 134 and 136 are mounted to device body 102 on respective pivot hinges that allow a user to pivot keyboard portions 134 and 136 between an extended position and a retracted position, as indicated by the arrows in FIG. 3. As the term is used herein, "hinge" is intended to include all suitable pivoting, swinging and similar mechanisms and interconnections. Thus, although in the illustrated embodiment of the invention each hinge comprises a single pin 138 and 140, respectively, each pivoting on an axis normal to front face 108, in other embodiments the hinge can have any other suitable structure. Moreover, in other embodiments the deployment mechanism can comprise more than a hinge alone, such as arms or linkages, with the keyboard portions being moved in multiple motions or on various axes (e.g., a pivoting motion plus a sliding motion). Nevertheless, an advantage of the illustrated mechanism is that a user can quickly and easily extend each keyboard portion 134 and 136 with only a single pivoting or swinging motion. Furthermore, in the illustrated embodiment of the invention, in addition to pins 138 and 140, each hinge further comprises a gear 139 and 141, respectively. Gear 139 is attached to and rotates along with the movement of keyboard portion 134, and gear 141 is attached to and rotates along with the movement of keyboard portion 136. (In still other embodiments, the gears or similar elements could be integrally formed with the keyboard portions.) The teeth of gear 139 mesh with those of gear 141 such that both keyboard portions 134 and 136 move at the same angle rate of position. In some embodiments of the invention, biasing means, such as small coil springs or power springs (not shown for purposes of clarity) around pins 138 and 140 that bias keyboard portions 134 and 136 with respect to device body 102 can be included to provide a pivoting force to aid extending or, alternatively, retracting keyboard portions 134 and 136.

FIG. 3 illustrates the pivoting movement of each of keyboard portions 134 and 136 between its fully extended position, an intermediate or partially extended position, and its retracted position. In the illustrated embodiment of the invention, in their retracted positions, keyboard portions 134 and 136 are stored and concealed within slots 142 and 144 in sides 116 and 118, respectively, but in other embodiments they can be stored or otherwise disposed within the confines of the outline or profile of device body 102 in any other suitable manner. Slider latches 146 and 148 in keyboard portions 136 and 134 latch them in their retracted positions within slots 142 and 144, respectively. Detents or protrusions 145 and 147 on the backs of keyboard portions 134 and 136 follow in grooves 149 and 151, respectively, in the surface of body 102 facing keyboard portions 134 and 136 to aid guiding the pivoting movement as well as to provide stops (at the ends of the grooves) to prevent inadvertent pivoting past the extended and retracted positions.

As illustrated in FIGS. 3 and 6–8, to extend keyboard 106, the user actuates each of slider latches 146 and 148, releasing keyboard portions 136 and 134, respectively, from slots 142 and 144. A lip on each of slider latches 146 and 148 facilitates the user's grip on keyboard portions 134 and 136. In embodiments of the invention in which gears 139 and 141 or a similar mechanism are included, the user need only extend one of keyboard portions 134 and 136, and the other will follow. Stated another way, in such embodiments the step of moving one of keyboard portions 134 and 136 may occur automatically in response to the step of moving the other. In embodiments without such a mechanism, the user may extend keyboard portions 134 sequentially or more or less simultaneously. In any event, gripping one or both keyboard portions 134 and 136 in such a manner, the user pivots them until they reach their extended position shown in, for example, FIGS. 1–2. In embodiments having means for biasing keyboard portions 134 and 136 toward the extended position, once unlatched, keyboard portions 134 and 136 may extend substantially by themselves, with minimal or no application of additional pivoting force by the user. Note that as keyboard portions 134 and 136 are pivoted into this position, an edge of each approaches and ultimately contacts or substantially contacts an edge of the other. This efficient deployment is facilitated by the location of pins 138 and 140 in the corners of keyboard portions 134 and 136. In embodiments having means for guiding and stopping the pivoting movement, such as detents 145 and 147 and corresponding grooves 149 and 151, the user may feel or hear keyboard portions 134 and 136 gently snap into place in their extended positions. With their inside edges adjacent to each other, the two adjoining or contiguous keyboard portions 134 and 136 are thus united into a single keyboard unit. This resulting complete keyboard unit has the appearance and rectangular shape characteristic of a conventional QWERTY keyboard with which typists will be familiar and thus comfortable. Accordingly, keyboard portions 134 and 136 have keys 150, preferably of the soft rubber type, collectively labeled with all the letters of the Roman alphabet and other symbols typical of QWERTY keyboards and arranged in a layout resembling that of a conventional QWERTY keyboard, i.e., with the "Q" key in the upper left, the "W" key to its right, etc. Although the keyboard unit layout is QWERTY in the illustrated embodiment of the invention, other layouts or arrangements that define a complete text keyboard are suitable. As used herein, the term "complete text keyboard" refers to a keyboard having a complete alphabetic set of keys of a standard number and layout for typing text. The layout may be the QWERTY layout popular with typists in the United States, the similar though not identical layouts popular in some other countries, or other known layouts such as the Dvorak. In addition to alphabetic, numeric and symbolic keys 150, keyboard 106 can have additional keys 152 that can be used for functions similar to those for which "function keys" are used on a conventional computer keyboard or for other purposes. It should further be noted that the term "keyboard," standing alone or at least not modified by any of the above-mentioned terms, such as "text," "QWERTY," "complete," or "unit," is intended to include within its scope all keyboards, keypads and similar user input means.

Once keyboard 106 is extended, the user can type in the normal manner. Users may find it comfortable to type using only thumbs or index fingers. As shown in FIG. 1, a user can extend two legs 154 and 156 that pivot away from rear face 110 (see also FIG. 5) and prop mobile communication device 100 on a table or other work surface at a comfortable angle for viewing display screen 104 and typing on keyboard 106. The typist's positioning of his or her fingers in this manner on a keyboard 106 located below a corresponding display screen 104 is typical of the manner in which a typist uses a conventional desktop computer or other full-sized text-based system and will therefore be familiar and reassuring. A user can, for example, compose e-mail messages or other text-based messages and have device 100 transmit them in the conventional manner to a wireless Internet gateway or other destination. Similarly, a user can view e-mail messages received in such a manner on display screen 104. Hardware and software elements for effecting such functions are represented by the block diagram of FIG. 9, described below.

When finished working, or when the user otherwise desires to transport or compactly store mobile communication device 100, the user can retract the keyboard by reversing the above-described steps for extending the keyboard. That is, the user grips one or both keyboard portions 134 and 136 and pivots them until they reach their retracted position. In embodiments having means for guiding or stopping the pivoting movement, such as detents 145 and 147 and corresponding grooves 149 and 151, the user may feel or hear keyboard portions 134 and 136 gently snap into place in their retracted positions. Slider latches 146 and 148, which may also include a snap or catch mechanism, latch keyboard portions 136 and 134 in their retracted positions within slots 142 and 144.

Mobile communication device 100 can be powered by a conventional battery pack 158 attached to rear face 110 of device body 102 in a user-removable fashion, as illustrated in FIGS. 5–8. One or more jacks 160 (FIGS. 6–7) can be provided on device body 102 for connection to external devices, such as a battery charger.

Figure 9:
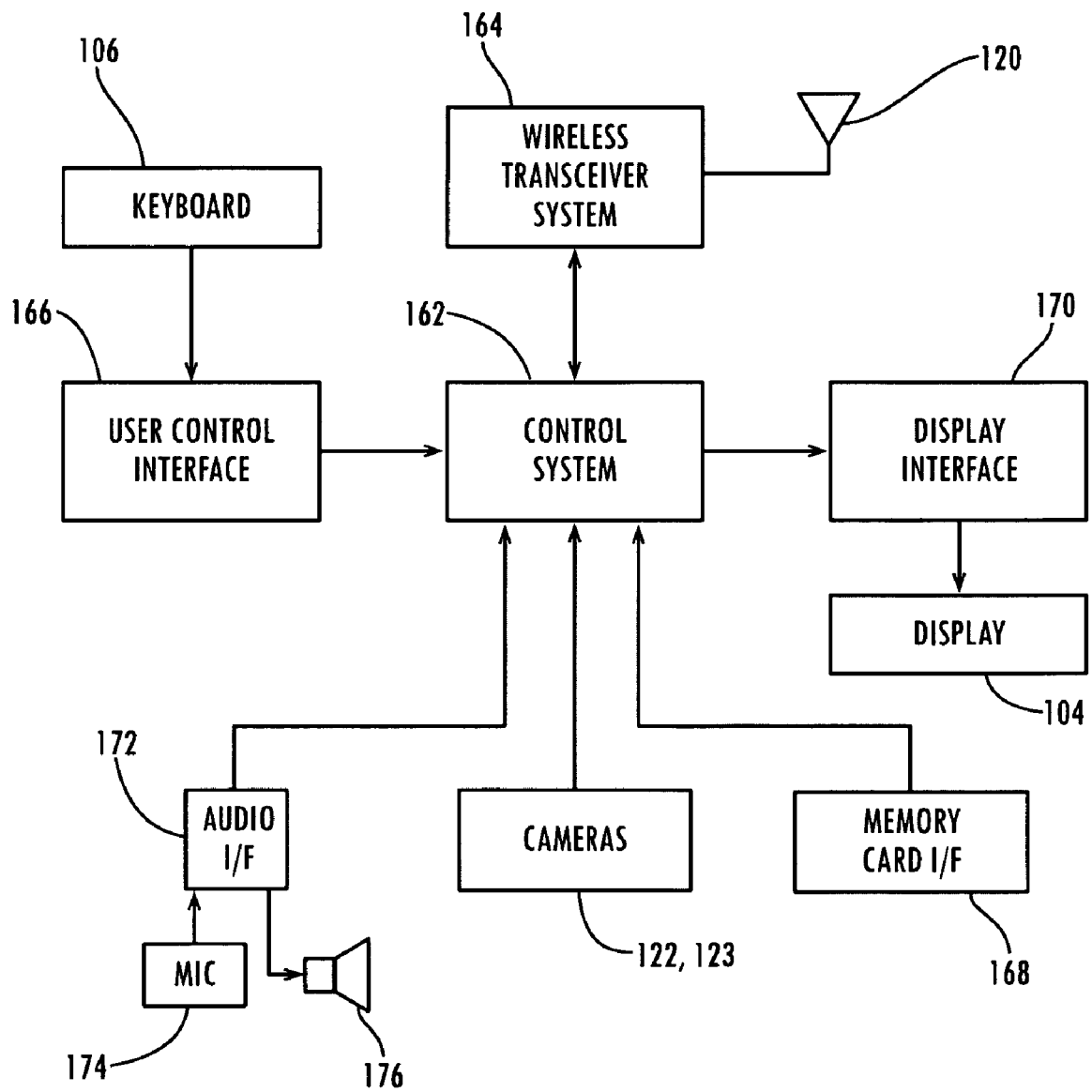
FIG. 9 is schematic block diagram of the mobile communication device of FIG. 1.

As illustrated in FIG. 9, the processing system of mobile communication device 100 includes a control system 162, a wireless transceiver system 164, a user control interface 166, a memory card interface 168 for Secure Digital Memory cards or similar plug-in devices, a display interface 170, and an audio interface 172. Control system 162 includes one or more processors, suitable program and operating memory, and other hardware and software elements of the types that are common in conventional personal digital assistants (PDAs), cellular telephones, hybrids thereof, and similar mobile or portable devices. For example, programs can be included to effect address book, calendar, organizer and other functions known to be useful in such devices. Wireless transceiver system 164 includes suitable radio frequency circuitry and can be of any conventional type usable in cellular and similar wireless digital communication systems. User control interface 166 interfaces control system 162 with keys 150 of keyboard 106 and the various other keys and user controls described above. Display interface 170 interfaces control system 162 with display screen 104. Audio interface 172 interfaces control system 162 with the microphone 174 and speaker 176 through which the user communicates when device 100 is used in the manner of a mobile telephone. It should be noted that although the above-described elements are suitable for the processing system of a mobile communication device 100, such as a cellular telephone, wireless-enabled PDA, and hybrids thereof, the processing system elements and other elements may be substantially different if the invention is embodied as a handheld electronic game or other type of mobile digital device.

FIGS. 10–11 emphasize that in other embodiments of the invention the keyboard portions 178 and 180 retract within the profile of the device body 182 as described above with regard to the embodiment illustrated in FIGS. 1–9, but do not necessarily retract into slots or the same type of slots as described above. For example, as illustrated in FIGS. 10–11, they can retract into a recess or recesses in the rear face 184 of device body 182. All other elements included in this embodiment can be essentially the same as in the above-mentioned embodiment (and are therefore not illustrated separately for purposes of clarity), with any suitable accommodations made as will be recognized by persons skilled in the art for this alternative arrangement of the retracted keyboard portions 178 and 180. For example, the battery pack 186 can be disposed as illustrated, to avoid interference with keyboard portions 178 and 180. Keyboard portions 178 and 180 extend and retract in the same manner and the device can otherwise be used in the same manner as described above with regard to the embodiment illustrated in FIGS. 1-9. Thus, gripping keyboard portions 178 and 180, the user pivots them until they reach their extended position in which an edge of each is adjacent an edge of the other, making them contiguous or adjoining and thus uniting them into a single keyboard unit.

FIGS. 12–13 emphasize that in other still other embodiments of the invention the keyboard portions 188 and 190 retract within the profile of the device body 192 as described above with regard to other embodiments but do not necessarily retract into the same types of slots or recesses described above. For example, as illustrated in FIGS. 12–13, they can retract flush against the rear face 194 of device body 190. All other elements included in this embodiment can be essentially the same as in the above-described embodiments (and are therefore not illustrated separately for purposes of clarity), with any suitable accommodations made as will be recognized by persons skilled in the art for this alternative arrangement of the retracted keyboard portions 188 and 190, such as the position of the battery pack 196. Keyboard portions 188 and 190 extend and retract in the same manner and the device can otherwise be used in the same manner described as above with regard to the embodiment illustrated in FIGS. 1–9. Thus, gripping keyboard portions 188 and 190, the user pivots them until they reach their extended position in which an edge of each is adjacent an edge of the other, making them contiguous or adjoining and thus uniting them into a single keyboard unit.

As noted above, in yet other embodiments of the invention, the keyboard, and particularly the hinge structure, can be arranged in still other ways. For example, in the embodiment of the invention illustrated in FIGS. 14–16, the keyboard portions 198 and 200 can be layered or tiered and pivot about the same pin 202 with respect to the device body 204. Furthermore, in some such single-pin embodiments, the tops of the keys 206 can be made to be coplanar or level with one another across the entire keyboard unit by elevating keys 206 of one keyboard portion 200 on a support 208 or recessing keys 206 of the other keyboard portion 198 or both. All other elements included in this embodiment can be essentially the same as in the above-described embodiments (and are therefore not illustrated separately for purposes of clarity), with any suitable accommodations made as will be recognized by persons skilled in the art for this alternative keyboard arrangement, such as the position of the battery pack 210. Keyboard portions 198 and 200 extend and retract in essentially the same manner and the device can otherwise be used in the same manner described above with regard to the embodiment illustrated in FIGS. 1–9. Thus, gripping keyboard portions 198 and 200, the user pivots them until they reach their extended position in which an edge of each is adjacent an edge of the other, making them contiguous or adjoining and thus uniting them into a single keyboard unit. In view of the teachings herein of various alternative arrangements for the retractable keyboard in accordance with the present invention, it will be apparent to persons skilled in the art that the present invention can be embodied in still other ways.

It will be apparent to persons skilled in the art to which the invention relates that a mobile digital device embodied in accordance with the present invention can have any suitable combination of the features or elements described above or additional elements, including all those that are known to be useful in conventional PDAs, cellular telephones, handheld games, and other such mobile digital devices. Indeed, but for elements relating to the novel keyboard, mobile digital devices of the present invention can be of essentially any suitable structure and function.

More generally, it will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A mobile digital device, comprising:
   a device body, wherein the device body has a generally flat and rectangular shape;
   a display screen coupled to the body, wherein the display screen is fixedly mounted in a face of the device body;
   a keyboard, comprising:
   a first keyboard portion movably connected to the body and movable by a user between an extended position and a retracted position, wherein the first keyboard portion has a generally flat and rectangular shape, is substantially coplanar with the device body and display screen, and is hinged on an axis substantially normal to a plane of the first keyboard portion and the face of the device body in which the display screen is mounted;

a second keyboard portion movably connected to the body and movable by a user between an extended position and a retracted position; wherein second keyboard portion has a generally flat and rectangular shape, is substantially coplanar with the device body and the display screen, and is hinged on an axis substantially normal to a plane of the second keyboard portion and the face of the device body in which the display screen is mounted;

wherein the first and second keyboard portions when in their extended portions together define a user-ready, complete text keyboard and when in their retracted positions are disposed within a profile of the device body, wherein the plane of the first keyboard portion is not co-planar with the plane of the second keyboard portion in at least one of the extended and retracted positions, and wherein the first and second keyboard portions are hinged on the same axis as one another; and a digital wireless communication system for transmitting information entered on the keyboard and receiving information to be displayed on the display screen.

2. The mobile digital device as claimed in claim 1, wherein the first and second keyboard portions when in their extended positions are disposed below the display screen from a user perspective.

3. The mobile digital device as claimed in claim 1, wherein the first and second keyboard portions when in their extended positions adjoin and are contiguous with one another to together define a complete text keyboard unit.

4. The mobile digital device as claimed in claim 3, wherein the keyboard is a complete text keyboard unit having a QWERTY arrangement.

5. The mobile digital device as claimed in claim 1, further comprising means for guiding movement of the first and second keyboard portions between the extended and retracted positions.

6. The mobile digital device as claimed in claim 1, further comprising means for inhibiting the first and second keyboard portions from at least one of extending beyond the extended position and retracting beyond the retracted position.

7. The mobile digital device as claimed in claim 1, wherein:

when in the retracted position the first keyboard portion is disposed within a first slot in the body; and when in the retracted position the second keyboard portion is disposed within a second slot in the body.

8. The mobile digital device as claimed in claim 1, wherein the first and second keyboard portions have respective inside edges that are adjacent to one another in the extended positions and apart from one another in the retracted positions, and when in the extended positions the first and second keyboard portions adjoin one another to together define a substantially rectangular keyboard unit.

9. The mobile digital device as claimed in claim 8, wherein the first and second keyboard portions when in the extended positions are disposed below the display screen from a user perspective.

10. The mobile digital device as claimed in claim 8, wherein the first and second keyboard portions when in the extended positions together define a QWERTY keyboard arrangement.

11. The mobile digital device as claimed in claim 10, wherein:

when in the retracted position the first keyboard portion is disposed within a first slot in the body; and when in the retracted position the second keyboard portion is disposed within a second slot in the body.

12. The mobile digital device as claimed in claim 11, further comprising a user-operable latch for selectably securing and releasing at least one of the first and second keyboard portions from the slot in which it is disposed in the retracted position.

13. The mobile digital device as claimed in claim 11, wherein the first and second keyboard portions adjoin one another when in the retracted position.

14. The mobile digital device as claimed in claim 11, further comprising one or more extendable legs for propping the mobile digital device on a work surface.

* * * * *